United States Patent [19]

Van House

[11] 4,412,416
[45] Nov. 1, 1983

[54] ALTITUDE COMPENSATED VACUUM SUPPLY SYSTEM AND CONTROL

[75] Inventor: Robert M. Van House, Dayton, Ohio

[73] Assignee: General Motors Corporation, Detroit, Mich.

[21] Appl. No.: 198,638

[22] Filed: Oct. 20, 1980

[51] Int. Cl.³ .......................................... F15B 15/18
[52] U.S. Cl. ...................................... 60/397; 60/409; 60/412; 417/14
[58] Field of Search ............... 60/397, 407, 409, 412, 60/430; 123/198 R; 417/14

[56] References Cited

U.S. PATENT DOCUMENTS

| | | | |
|---|---|---|---|
| 2,323,519 | 7/1943 | Dean | 60/397 |
| 2,705,870 | 4/1955 | Holton | 60/397 |
| 2,844,003 | 7/1958 | Ingres | 60/397 |
| 4,328,669 | 5/1982 | Mort | 60/397 |
| 4,358,928 | 11/1982 | Kotwicki | 60/397 |

Primary Examiner—Robert G. Nilson
Attorney, Agent, or Firm—Robert J. Outland

[57] ABSTRACT

An altitude compensating control system for a vacuum pump supplying a vehicle accessory vacuum supply system comprising, in a preferred embodiment, a dual diaphragm pressure switch spring biased in a closing direction to actuate the pump and having an ambient pressure exposed diaphragm acting in a switch-opening direction opposed by a controlled vacuum pressure exposed diaphragm of larger area acting in a switch closing direction to provide a controlled vacuum pressure range that declines from a desired operational vacuum pressure range at sea level to a lower satisfactory vacuum level for efficient operation at higher altitudes. Other features and advantages are also disclosed.

4 Claims, 3 Drawing Figures

ALTITUDE COMPENSATED VACUUM SUPPLY SYSTEM AND CONTROL

TECHNICAL FIELD

This invention relates to vacuum supply systems especially for automotive vehicles and, more particularly, to altitude compensating on-off controls for vacuum pumps in such vacuum systems.

BACKGROUND

It is known in the art to utilize various vacuum powered accessories in automotive vehicles in which vacuum for operating such accessories is provided by the engine, a separate vacuum pump or a combination of both. For example, U.S. patent application Ser. No. 121,671 filed Feb. 15, 1980, now U.S. Pat. No. 4,328,669, and assigned to the assignee of the present invention shows a vacuum supply system that utilizes engine intake vacuum supplemented by an auxiliary vacuum pump. An electric motor, or other drive means, is actuated to operate the pump whenever the vacuum drops below a predetermined desired value. A pressure switch responsive to vacuum in the vacuum system is utilized to control operation of the vacuum pump drive means to provide the desired vacuum level.

While such systems may provide satisfactory operation, it is thought possible that the large variations in altitude at which automotive vehicles may be operated may warrant provision of an altitude compensating control system. Thus it is desired to provide a control system that will efficiently deliver a high level of vacuum for accessory operation at sea level with altitude compensation that reduces the level of vacuum provided when operating at higher altitude so as to avoid excessive and inefficient operation of the vacuum pump.

SUMMARY OF THE INVENTION

The present invention provides an altitude compensating vacuum pump control for a vehicle vacuum system. The control responds to a reduction of ambient pressure by reducing, in a predetermined manner, the controlled vacuum range in which an associated vacuum pump is operated, thus combining a relatively high vacuum range at sea level with more efficient pump operation in a reduced vacuum range when at higher altitudes.

These and other features of the invention will be more fully understood from the following description of a preferred embodiment taken together with the accompanying drawing.

BEST MODE DISCLOSURE

Figure 1:
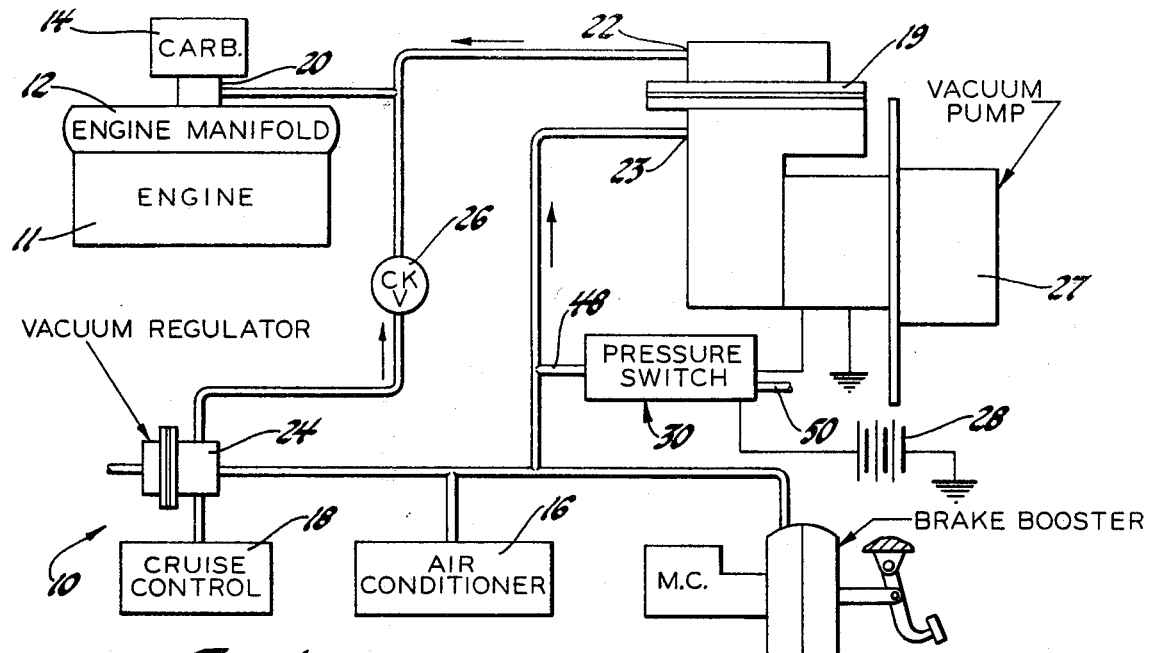
FIG. 1 is a schematic diagram of a vehicle vacuum supply system having altitude compensating vacuum control means in accordance with the invention.

Referring first to FIG. 1 of the drawing, there is shown an automotive vehicle generally indicated by numeral 10. Vehicle 10 is provided with an internal combustion engine 11 having an induction system including an intake manifold 12 with a carburetor 14 mounted thereon in conventional manner.

The carburetor is provided with the usual intake throttle, not shown, which variably restricts air flow into the intake manifold so that, during engine operation, varying vacuum pressure levels are present in the intake manifold and the induction system downstream of the throttle. These vacuum pressures are utilized to actuate vacuum motors and controls of various accessory devices including a power brake booster 15, an air conditioner 16 and a cruise control 18. A vacuum pump 19 is also provided to supplement the engine vacuum available for powering the accessories. The previously mentioned components, as well as others to be subsequently described, are connected by conduits in the following manner. The engine intake manifold 12 and the induction system below the throttle are connected at a point 20 with the outlet 22 of the vacuum pump. The inlet 23 of the pump is in turn connected directly with the brake booster 15 and air conditioner 16 and is also connected with the cruise control through a vacuum regulator 24. The vacuum regulator may also be connected directly with the point 20 of the engine induction system through a check valve 26 which permits flow only in a direction toward the engine through this valve.

The structure and operation of the vacuum regulator, which forms no part of the present invention, are fully described in the previously mentioned U.S. patent application Ser. No. 121,671.

In order to selectively drive the vacuum pump 19 to supplement the vacuum provided by the engine induction system to the accessories, the vacuum pump is drivably connected with an electric motor 27 that is powered by a source of electric power such as a battery 28. The latter is selectively connected with motor 27 by operation of an altitude compensating vacuum pump control pressure switch 30 formed in accordance with the invention.

Figure 2:
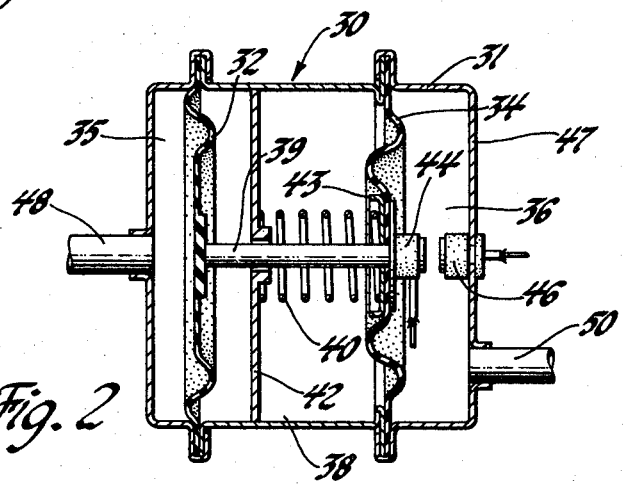
FIG. 2 is a cross-sectional view of a pressure switch embodying certain features of the present invention.

The detailed construction of a preferred embodiment of the pressure switch 30 is shown in FIG. 2. The switch includes a multi-piece housing 31 that sealingly retains the edges of a pair of axially spaced diaphragms 32 and 34. These respectively constitute first and second movable interior walls that divide the interior of the housing into first and second expansible chambers 35 and 36, respectively, and an intermediate chamber 38.

A rod 39 extending axially through the center of the intermediate chamber 38 connects the centers of the diaphragms 32 and 34, constraining them to coincident motion along the axis of the rod.

A spring 40, seated against a supporting wall 42 within the intermediate chamber 38, also engages a seat 43 in the center of diaphragm 34, biasing the assembly of the rod and the center portions of the diaphragms in a rightward direction as shown in the drawing. The force of the spring is sufficient in the absence of other pressures to close, or force into engagement, a pair of electrical contacts 44, 46 positioned within the second expansible chamber 36 and mounted respectively on the movable center of diaphragm 34 and the opposite end wall 47 of the housing 30. Contacts 44 and 46 are respectively connected with the battery 28 and the vacuum pump motor 27 so that, when they are closed, the electric motor is actuated to drive the vacuum pump and supplement the vacuum supplied to the vacuum powered accessories by the engine induction system.

Chamber 35 of the pressure switch 30 is connected by a conduit 48 with the vacuum pressure existing in the system between the pump inlet 23 and the various vacuum powered accessories so as to apply the controlled vacuum pressure directly against the first-chamber-exposed side of diaphragm 32. Chamber 36 is connected through a conduit 50 with a filter or other device open to ambient pressure so that the second-chamber-exposed side of diaphragm 34 is exposed to ambient pressure. Intermediate chamber 38 is preferably evacuated so that a relatively constant pressure, unaffected by temperature changes, is maintained within the sealed chamber. If desired, however, a positive or negative pressure of relatively constant value may be allowed to exist within the intermediate chamber 38.

In accordance with the invention, the effective movable area of diaphragm 34 is made smaller than that of diaphragm 32 so that the forces exerted by equivalent pressures acting on the two diaphragms are unequal, the greater force being developed by the larger diaphragm 32. Alternatively, it would be possible to use a variable movement linkage between two diaphragms, rather than the direct rod connection of the illustrated embodiment, so that a similar balance of forces could be obtained with diaphragms or other movable wall means of equal area having differing lengths of relative coincident motion.

In normal operation of the engine in the vehicle 10, the induction system develops in the manifold a variable vacuum which is communicated through the vacuum pump to the various vacuum powered accessories 15, 16 and 18 and to the first chamber 35 of the vacuum switch 30. When the vacuum level is within the desired operating range, the pressure differential across the diaphragm 32 together with the biasing force of the spring 40 is insufficient to overcome the force of ambient pressure in the chamber 36 acting on the diaphragm 34. Thus the contacts 44, 46 of the pressure switch are separated as shown in the drawing and the vacuum pump is inoperative.

However, reduction of the controlled vacuum increases the absolute pressure in the first chamber 35 such that, at a predetermined level, the force acting on the diaphragm 32 together with the biasing force of the spring 40 is sufficient to overcome the force of ambient pressure in the chamber 36 and close the contacts 44, 46. This closes the electric circuit, starting the motor 27 which operates the vacuum pump 19 to supplement the level of the controlled vacuum. The pump continues to operate until the vacuum is increased sufficiently for ambient pressure, opposing the vacuum pressure and the biasing spring, to again open the contacts and disconnect the pump motor.

Figure 3:
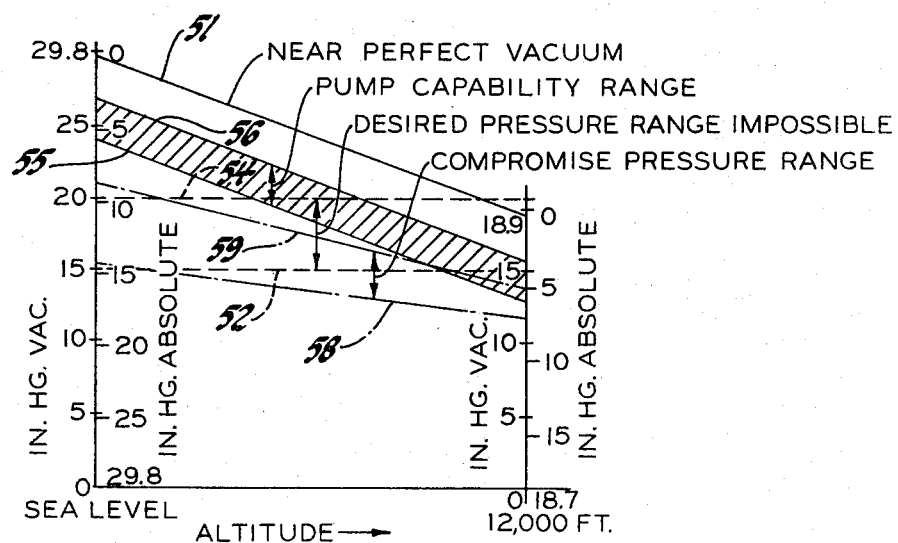
FIG. 3 is a graphical illustration of the operating characteristics of a vacuum system having altitude compensating means in accordance with the present invention.

Referring now to FIG. 3, there is graphically shown the effects on vacuum systems of operation at varying altitudes and the manner in which the present system responds thereto. As the Figure makes clear, a perfect vacuum cannot exceed the numerical value of the ambient pressure at the place of measurement. Thus at sea level, where the ambient pressure is indicated as being approximately 29.8 inches of mercury (in. Hg), the maximum possible vacuum is also 29.8 in. Hg. However, at an altitude of 12,000 feet the ambient pressure drops to about 18.7 in. Hg so that the maximum possible vacuum available at this altitude is likewise reduced to 18.7 in. Hg. This declining value of the ambient pressure and available vacuum with increasing altitude is indicated by the line 51 of the Figure.

In a particular application, there may be a predetermined range of vacuum pressures of, for example, between 15 and 20 in. Hg, represented by lines 52 and 54, respectively, which it would be preferable to maintain for operation of the vehicle accessories under all conditions. However neither the engine nor the supplemental vacuum pump can reach the level of a perfect vacuum and the desired range extends in part, at the 12,000 foot altitude level, above even the perfect vacuum range. The Figure indicates an approximate range of vacuum pump capability, indicated by the cross-lined zone between lines 55 and 56, which it is seen extends well above the desired vacuum pressure level at pressures near sea level but drops near the 12,000 foot altitude level to a range extending below the desired pressure range.

Recognizing that the vacuum powered accessories can be satisfactorily operated at pressure levels below that which the vacuum pump can maintain even at 12,000 feet of altitude, it would be possible to control the pump with a simple vacuum switch to maintain at all altitudes a desired vacuum level having a constant lower value of say 12 in. Hg. However, it is considered that desired operating efficiency together with improved operation of the vacuum powered accessories will be possible by providing a compromise pressure range such as that indicated by the alternating long-short lines 58, 59 of the Figure.

In accordance with the invention, this compromise pressure range approximates the desired pressure range at sea level, but drops at increasing altitude to a reduced pressure range which may be coextensive with, but preferably extends below, the range of pump vacuum pumping capability at 12,000 feet of altitude. This declining pressure range characteristic is obtained in the construction of the illustrated embodiment by properly proportioning the differential areas of the diaphragms 32 and 34 and the preload force of the spring 40 to provide the desired vacuums at the various ambient pressures in accordance with the formula:

$$Vac = p_o\left(1 - \frac{A_1}{A_2}\right) + \frac{F_o}{A_2} - p_y\left(1 - \frac{A_1}{A_2}\right)$$

Where:
Vac—vacuum pressure
$p_o$—ambient pressure
$A_1$—projected area, second diaphragm 34
$A_2$—projected area, first diaphragm 32
$F_o$—spring installed preload force
$p_y$—intermediate chamber pressure When the variables are properly selected in accordance with the invention, the pressure switch will operate to maintain vacuum pressures within the compromise pressure range at the various ambient pressure conditions from sea level to altitude, turning on the pump when the vacuum level drops at any altitude to a level equivalent for example to that of the line 58 and again turning off the pump whenever the vacuum level increases to a point above for example the line 59. Thus the primary purpose of the invention, to provide an altitude compensated vacuum level pump control is accomplished.

In addition, a switch in accordance with the arrangement of FIG. 2 has additional advantages. For example, should a leak develop in the housing or a diaphragm so that the intermediate chamber 38 is exposed to ambient pressure, the pressure switch will still operate the pump to maintain an adequate vacuum for operating accessories by trying to control vacuum pressure along a constant pressure line slightly higher than the minimum level reached in the desired pressure control zone. Further, if the vacuum connection to the pressure switch were disconnected, the biasing spring 40 would close the switch and the pump would run continuously, supplying adequate vacuum under all operating conditions. Thus control of the vacuum pump to provide adequate vacuum in the vacuum supply system is assured even in the event of a malfunction of the control system in the manner described.

While the invention has been described by reference to a preferred embodiment chosen for purposes of illustration, it should be understood that numerous changes could be made in the described features without departing from the spirit and scope of the inventive concepts disclosed. Accordingly it is intended that the invention not be limited to the features of the disclosed embodiment but that it have the full scope permitted by the language of the following claims.

The embodiments of the invention in which an exclusive property or privilege is claimed are defined as follows:

1. An altitude compensated vacuum supply system for operating accessories of an automotive vehicle, said system comprising
   a vacuum pump connected to at least one vacuum powered accessory device and drivable to provide vacuum for operating said device,
   driving means connected with and selectively operable to drive the pump, and
   control means to operate the driving means only when the vacuum pressure falls below a predetermined control range of vacuum pressures adequate for operation of the accessory device but lying well below the pump vacuum pumping capability at sea level and declining at increasing altitudes at a rate less than that of the decline in pump vacuum capability, said control means being differentially responsive to ambient pressure and to vacuum pressure between the pump and accessory device and operatively connected to selectively operate the driving means.

2. An altitude compensated vacuum supply system for operating automotive vehicle accessories, said system comprising
   an engine having an induction system in which vacuum is developed under at least certain operating conditions,
   at least one vacuum powered accessory device connected with the induction system to obtain vacuum when available for operating the device,
   a vacuum pump having an inlet and an outlet connected respectively to the accessory device and the induction system to provide additional vacuum to said device when needed and discharge into the induction system,
   driving means connected with and selectively operable to drive the pump, and
   control means to operate the driving means only when the vacuum pressure falls below a predetermined control range of vacuum pressures adequate for operation of the accessory devices but lying well below the pump vacuum pumping capability at sea level and declining at increasing altitudes at a rate less than that of the decline in pump vacuum capability, said control means being operatively connected to selectively operate said driving means and differentially responsive to ambient pressure and to vacuum pressure between the pump and accessory device.

3. The combination of either claim 1 or 2 wherein said control range of vacuum pressure lies below the level of vacuum pumping capability of the pump at the highest anticipated operating altitude for such vehicle whereby efficiency of the system is enhanced by the avoidance of continuous pump operation under normal operating conditions at all operating altitudes.

4. The combination of either claim 1 or 2 wherein said control range of vacuum pressures extends above the level of vacuum pumping capability of the pump only at high operating altitudes substantially above sea level whereby efficiency of the system is enhanced by the avoidance of continuous pump operation under operating conditions below said high operating altitudes.

* * * * *